United States Patent
Chen

(10) Patent No.: US 8,610,794 B2
(45) Date of Patent: Dec. 17, 2013

(54) METHOD OF PRODUCING AN IMAGE WITH A LIGHT TRACK

(75) Inventor: Chi-De Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 12/903,106

(22) Filed: Oct. 12, 2010

(65) Prior Publication Data

US 2012/0086831 A1    Apr. 12, 2012

(51) Int. Cl.
*H04N 5/235*    (2006.01)

(52) U.S. Cl.
USPC ............... 348/229.1; 348/222.1; 348/333.03

(58) Field of Classification Search
None
See application file for complete search history.

(56) References Cited

U.S. PATENT DOCUMENTS

| | | | |
|---|---|---|---|
| 2002/0001036 A1* | 1/2002 | Kinjo | 348/231 |
| 2003/0169350 A1* | 9/2003 | Wiezel et al. | 348/239 |
| 2005/0219384 A1* | 10/2005 | Herberger et al. | 348/239 |
| 2006/0033823 A1* | 2/2006 | Okamura | 348/254 |
| 2010/0225773 A1* | 9/2010 | Lee | 348/222.1 |

FOREIGN PATENT DOCUMENTS

| | | | |
|---|---|---|---|
| JP | 2008278028 A | | 11/2008 |
| JP | 2008278319 A | | 11/2008 |
| JP | 2010081038 A | | 4/2010 |
| KR | 20090068671 A | | 6/2009 |
| TW | 201030678 A | | 8/2010 |

OTHER PUBLICATIONS

Willis, K. "Light Tracer, Project Summary." 2005. http://lighttracer.darcy.co.nz/.*
Doble, R. "Camera Painting." Pixiq. 2010. Excerpted from "Experimental Digital Photography." http://www.pixiq.com/article/camera-painting.*
Willis, K. "User Authorship and Creativity within Interactivity." Proceedings of the 14th Annual ACM International Conference on Multimedia, ACM (2006), 731-735.*
Rosenbaum, E. "Glowdoodle: A Medium for Expressive Inquiry." Proceedings of the 7th ACM Conference on Creativity and Cognition, ACM (2009), 469-470.*
Taiwan Office Action Issued Aug. 22, 2013.

* cited by examiner

*Primary Examiner* — James Hannett
*Assistant Examiner* — Dwight C Tejano
(74) *Attorney, Agent, or Firm* — Rabin & Berdo, P.C.

(57) ABSTRACT

A method of producing an image is disclosed. At least one symbol is received. The at least one symbol is, optionally, displayed on a first image with at least one light spot. Subsequently, a position of an incident light projected on an image sensor of an image capturing device is varied during an exposure period according to the at least one symbol. Accordingly, a second image with a light track that traces the at least one symbol is captured.

17 Claims, 10 Drawing Sheets

METHOD OF PRODUCING AN IMAGE WITH A LIGHT TRACK

BACKGROUND OF THE INVENTION

1. Field of the Invention

The present invention generally relates to an imaging method, and more particularly to a method of producing an image with a light track.

2. Description of Related Art

In addition to capturing an image, cameras may be further utilized to create an artistic work by exploiting a variety of functions equipped in modern cameras. Light doodle (or light script) is one such artistic work created by moving the camera during exposure period such that a light spot may become a light track superimposed on a dark background image.

However, not every user can create a favorable light doodle for the reason either that the user is not skillful at mastering the camera or the user's camera is too limited in functions to allow the user to perform light scribing.

For the foregoing reasons, a need has arisen to propose a novel method to either assist the user in creating a favorable light doodle or even automatically create the light doodle according to what the user wants.

SUMMARY OF THE INVENTION

In view of the foregoing, it is an object of the embodiment of the present invention to provide a method of producing an image with a light track that traces at least one symbol. The method may assist the user in producing such image, or may automatically produce the image for the user.

According to one embodiment, at least one symbol is received, and a first image with at least one light spot is captured. The symbol is then displayed on a first image with at least one light spot. Subsequently, a position of an incident light projected on an image sensor of an image capturing device during an exposure period is varied according to the symbol, therefore capturing a second image with a light track that traces the symbol.

According to another embodiment, a first image with at least one light spot is captured. At least one symbol is received, and the symbol is displayed on the first image. Subsequently, a position of an incident light projected on an image sensor of an image capturing device during an exposure period is varied according to the symbol to capture a second image with a light track that traces the symbol.

According to a further embodiment, at least one symbol is received. Subsequently, a position of an incident light projected on an image sensor of an image capturing device during an exposure period is varied according to the symbol, therefore capturing an image with a light track that traces the symbol.

DETAILED DESCRIPTION OF THE INVENTION

Figure 1:
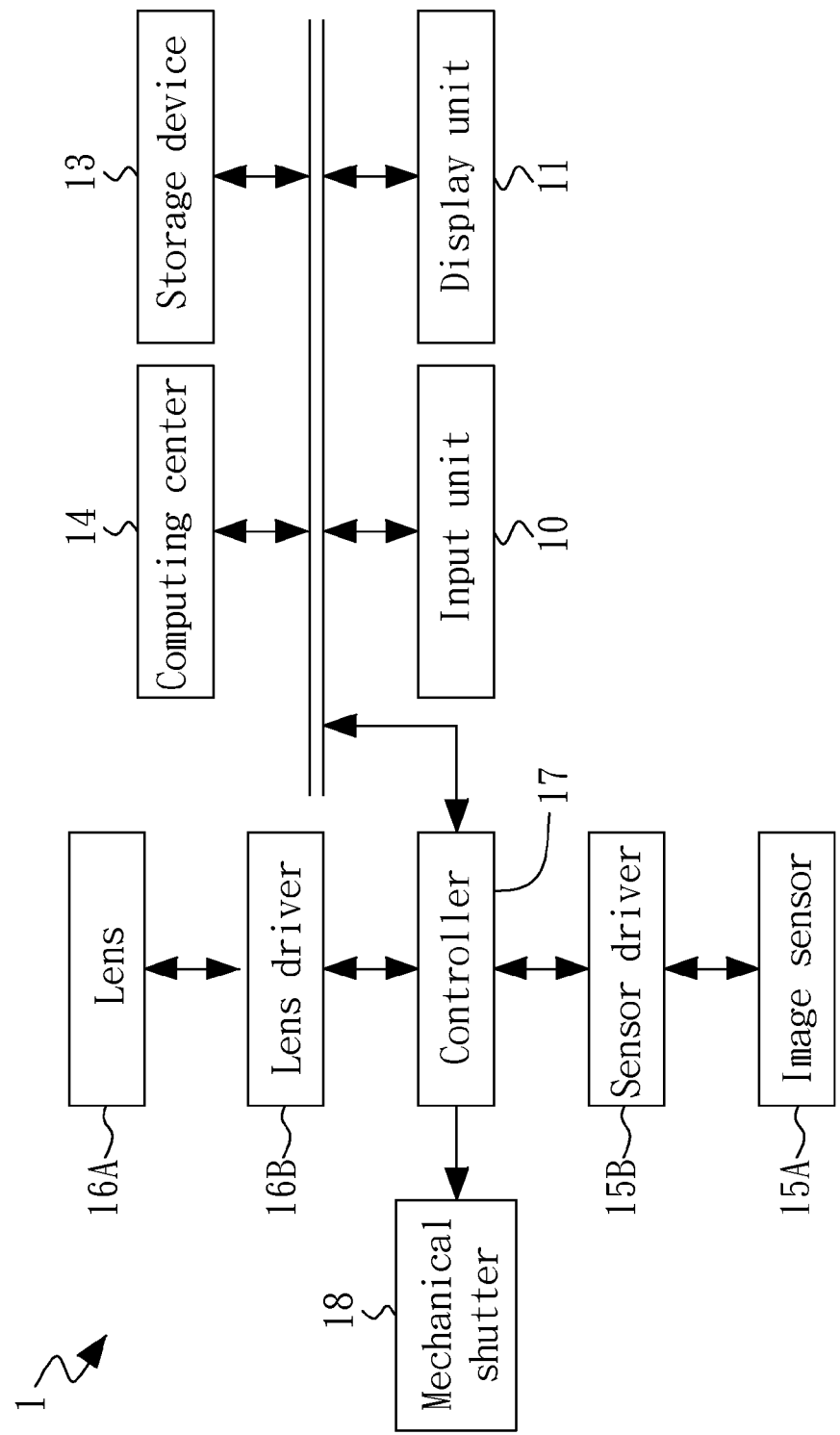
FIG. 1 shows a block diagram of an image capturing device adaptable to the present invention.

FIG. 1 shows a block diagram of an image capturing device 1 adaptable to the present invention. The image capturing device 1 is used in an embodiment of the present invention to produce an image with a light track that traces at least one symbol. The image capturing device 1 may be embedded in an electronic device such as a camera, a mobile phone, a video camcorder, an MP3 player, a personal digital assistant (PDA) or a webcam.

Referring to FIG. 1, the image capturing device 1 primarily includes an input unit 10, a display unit 11, a storage device 13, and a computing center 14. Specifically, the input unit 10 may be used in the embodiment to input the symbol. The input unit 10 may generally be a human input device (HID) such as a touch panel, a graphics tablet, a pointing device or a keyboard. The display unit 11 may be used in the embodiment to display the image and the symbol. The display unit 11 may be, but not limited to, a liquid crystal display (LCD) or an organic light emitting diode (OLED) display. The input unit 10 and the display unit 11 may be integrally coupled, for example, to form a touch screen. The storage device 13 may be used to store the symbol that is inputted from the input unit 10 or pre-store the symbol beforehand. The storage device 13 may be built-in the image capturing device 1, such as a hard disk drive or a memory device, or a removable storage, such as a memory card, a secure digital (SD) card, or a multimedia card (MMC). The computing center 14 may be used to subject the symbol to signal processing and can be a central processing unit (CPU) or digital signal processor (DSP).

Referring to FIG. 1, the image capturing device 1 further includes a controller 17, an image sensor 15A, a sensor driver 15B, a lens 16A, a lens driver 16B, and a shutter 18. Specifically, the shutter 18 may be opened or shut down under control of the controller 17 to make sure the quantity of an incident light coming from an object, and the shutter 18 may be a mechanical shutter or an electric shutter. The controller 17 may be used to control the lens driver 16B to drive the lens 16A to make the object image to be in-focus such that a clear image may be projected on the image sensor 15A. The controller 17 may be used to control the sensor driver 15B to drive the image sensor 15A to receive the incident light coming from the object, and the image sensor 15A may be a charge-coupled device (CCD) or a complementary metal-oxide-semiconductor (CMOS) image sensor.

Figure 2:
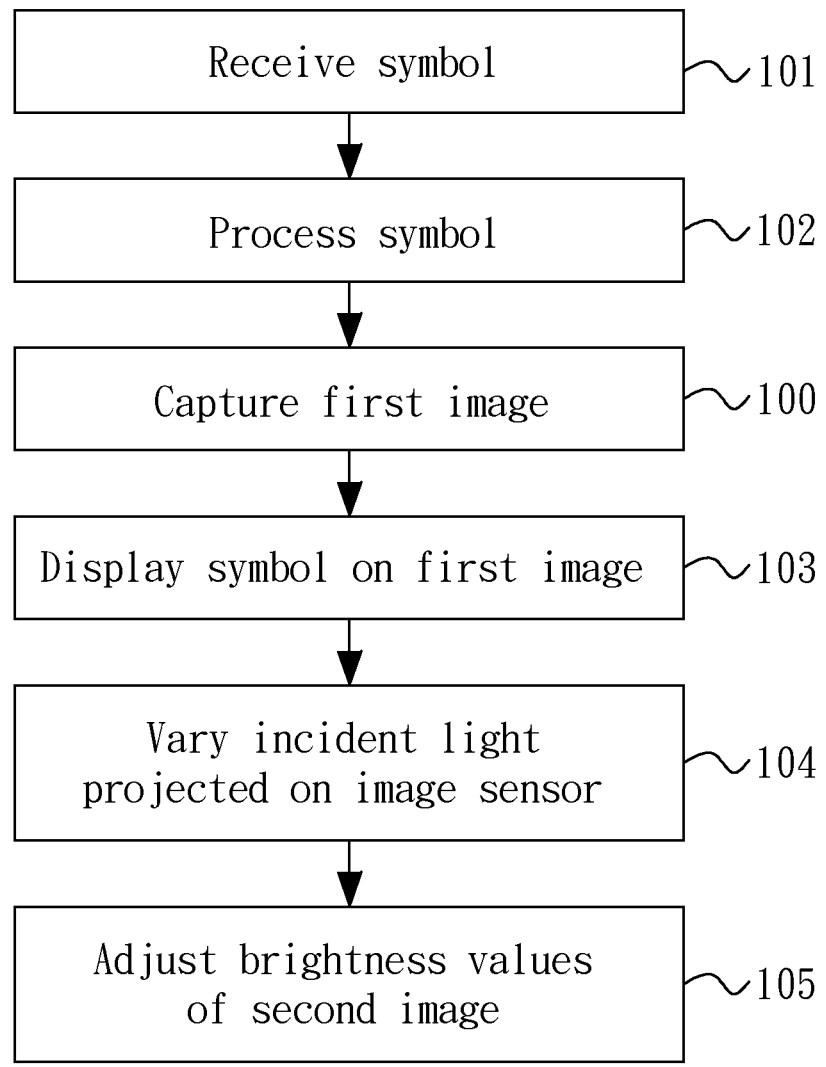
FIG. 2 shows a flow diagram illustrating a method of producing an image according to a first embodiment of the present invention.
Figure 3A:
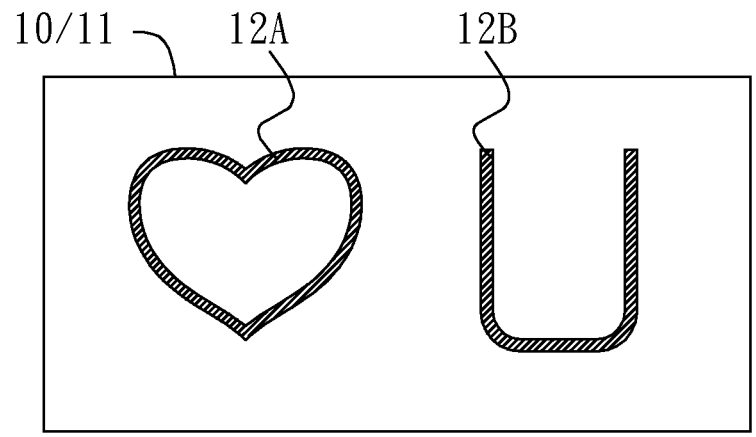
FIG. 3A shows a first symbol and a second symbol.

FIG. 2 shows a flow diagram illustrating a method of producing an image according to a first embodiment of the present invention. The image capturing device 1 as shown in FIG. 1 is adaptable to the flow diagram of FIG. 2. Specifically speaking, in step 101, the image capturing device 1 receives the symbol which is inputted from the input unit 10 or downloaded from the storage device 13, and the symbol may then be displayed on the display unit 11. Taking FIG. 3A as an example, FIG. 3A shows a first symbol 12A and a second symbol 12B that are inputted by the input unit 10 and are displayed on the display unit 11. As described above, the input unit 10 and the display unit 11 are integrally coupled to form the touch screen, and the symbol may be stored in the storage device 13.

Figure 3B:
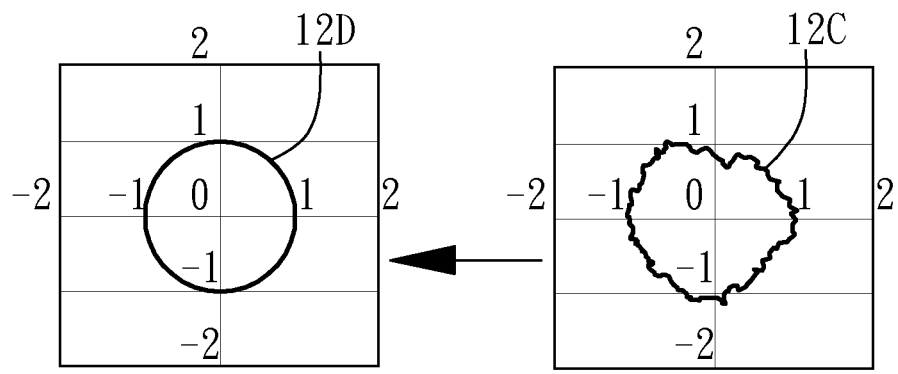
FIG. 3B shows an exemplary symbol and a processed symbol.

Referring to FIG. 2, in step 102, the symbol may be optionally processed by subjecting the symbol to the signal processing by the computing center 14 for filtering rugged line-segments of the symbol which is inputted from the input unit 10. For example, the computing center 14 performs low pass filtering or band pass filtering on the symbol. The low pass filtering and the band pass filtering may be implemented by finite impulse response (FIR) or infinite impulse response (IIR). FIG. 3B shows a raw symbol 12C and a processed symbol 12D. Specifically, the raw symbol 12C is a rugged circle centered at (0,0) with a radius of about 1. After subjecting the raw symbol 12C to the low pass filtering or the band pass filtering by the computing center 14, the processed symbol 12D with a smoothened circumference centered at (0,0) is provided.

Referring to FIG. 2, in step 100, a first image such as a preview image is captured and displayed on the display unit 11. The first image has at least one light spot, which includes at least one pixel with a brightness value greater than brightness values of other non-light spot portion of the first image.

Still referring to FIG. 2, in step 103, the symbol is displayed or superimposed on the first image displayed on the display unit 11 that may be performed by on-screen display (OSD) technique.

Referring to FIG. 2 and FIG. 1, in step 104, a position of the incident light projected on the image sensor 15A is varied during an exposure period. In the embodiment, after a shutter button is pressed to enter the exposure mode, the shutter 18 is opened and a user may move the image capturing device 1 in reference to the symbol shown on the display unit 11 such that the position of the light spot projected on the image sensor 15A is varied to trace the symbol. That is, the user may move the image capturing device 1 according to the light spot and the symbol in order to capture a second image with a light tract that traces the symbol. After the symbol has been traced, the shutter 18 is shut down. The shutter 18 may be shut down by pressing again the shutter button or may be shut down by the controller 17 when a predetermined exposure period has elapsed.

Figure 4A:
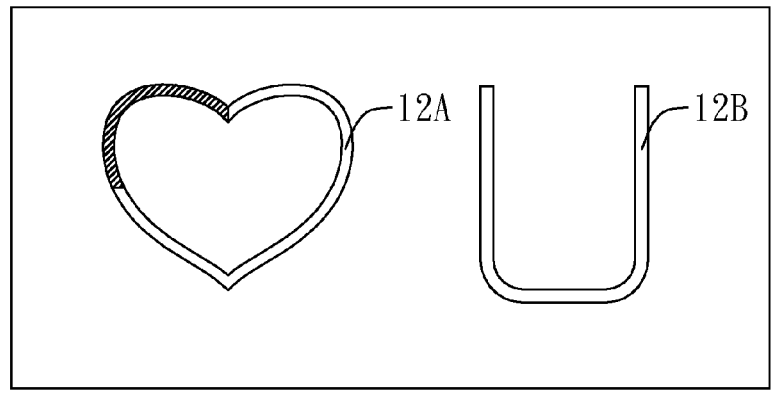
FIGS. 4A-4F show an exemplary sequence of displaying the symbol.
Figure 4B:
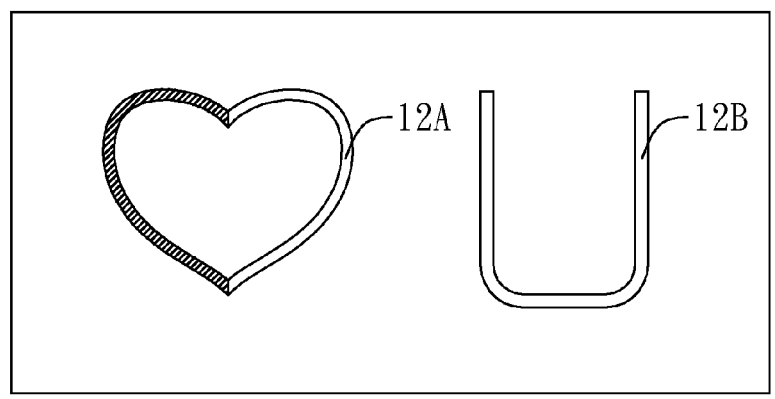
Figure 4C:
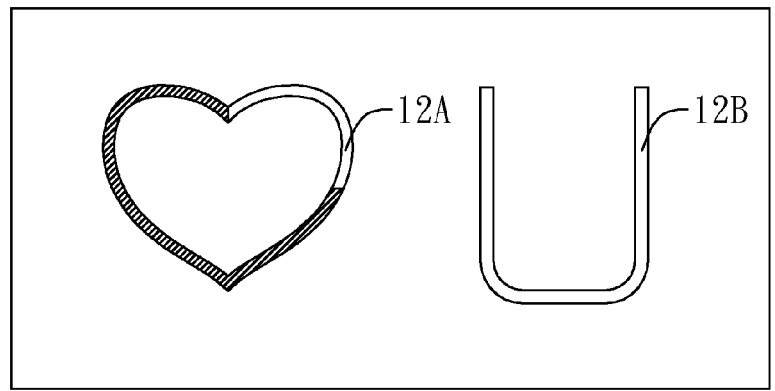
Figure 4D:
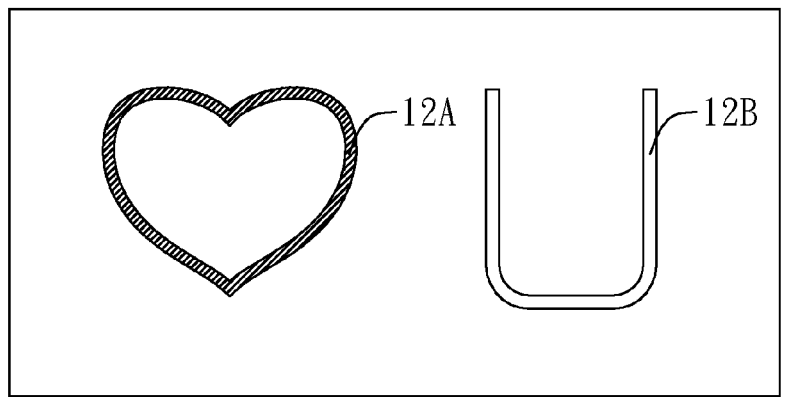
Figure 4E:
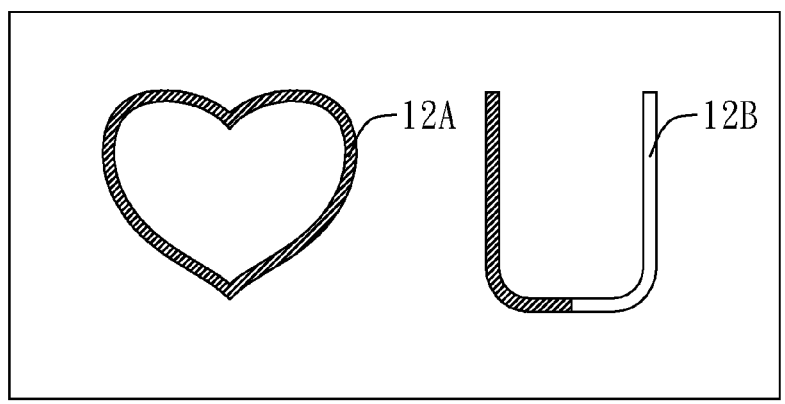
Figure 4F:
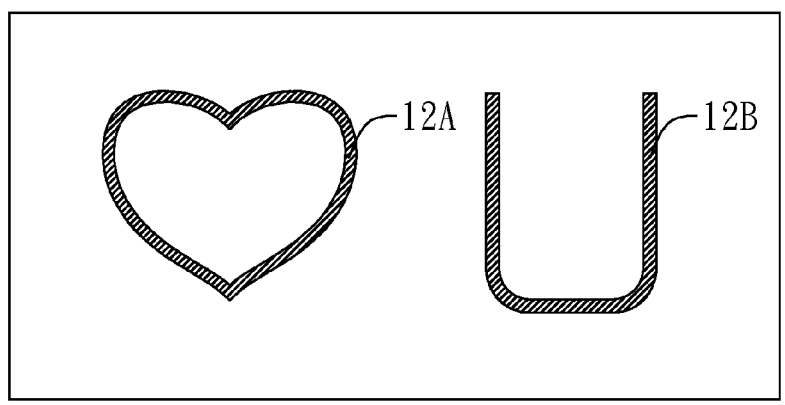

In order to assist the user in tracing the symbol, in the embodiment, the symbol is gradually highlighted according to a chronological order by which the symbol is inputted. FIGS. 4A-4F show an exemplary sequence of displaying the symbol. In this example, referring to FIG. 3A and FIGS. 4A-4F, the first symbol 12A is gradually highlighted as shown in FIG. 4A through FIG. 4D, while the second symbol 12B is less visible. During a transition period between the first symbol 12A and the second symbol 12B as shown in FIG. 4D, the image sensor 15B is blocked from exposure, such that no unwanted light track is produced between the first symbol 12A and the second symbol 12B. After the transition period, the second symbol 12B is gradually highlighted as shown in FIG. 4E through FIG. 4F.

Figure 5A:
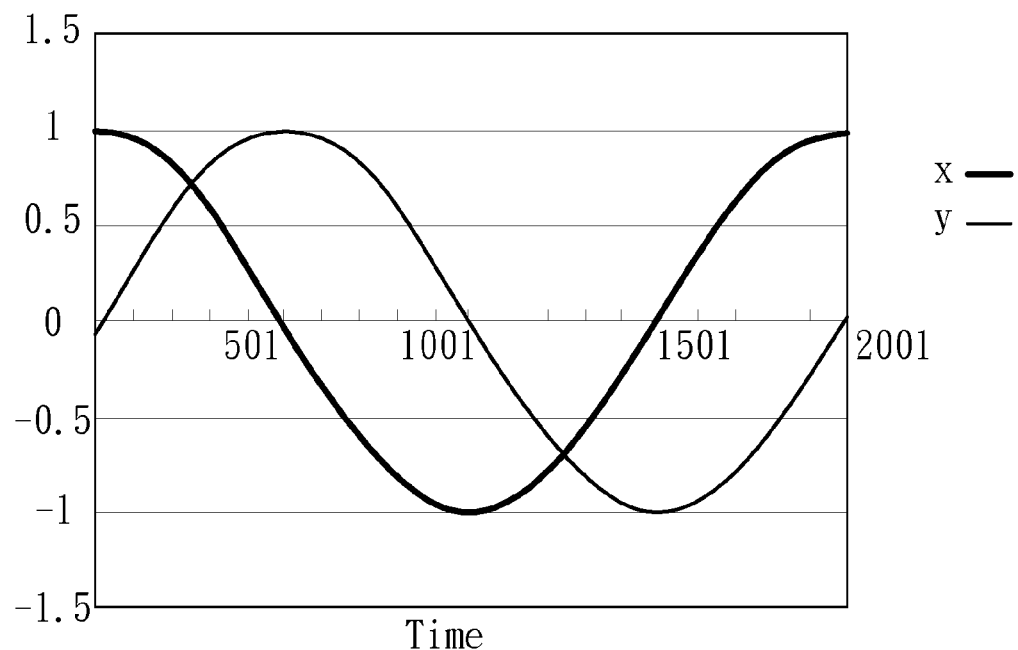
FIG. 5A shows horizontal/vertical (x/y) coordinates of the symbol of FIG. 3B during the exposure period without holding still.
Figure 5B:
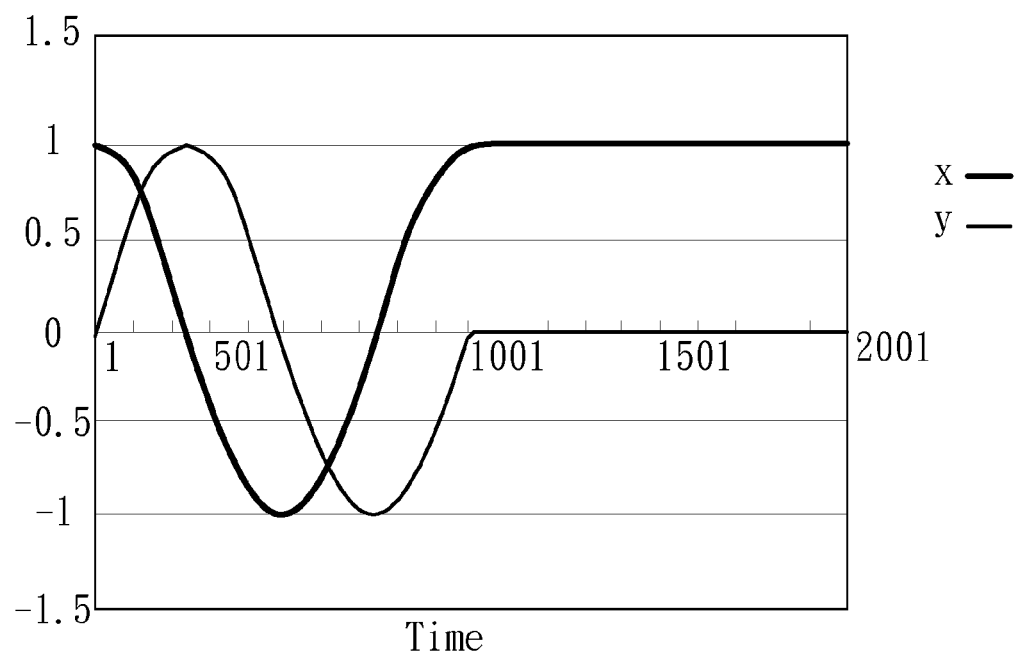
FIG. 5B shows horizontal/vertical (x/y) coordinates of the symbol of FIG. 3B during the exposure period with holding still.

In an embodiment alternative to the first embodiment, during a portion of the exposure period for example the second half of the exposure period, the image capturing device 1 is held still in order to obtain a more clearly exposed background. FIG. 5A shows horizontal/vertical (x/y) coordinates of the symbol of FIG. 3B during the exposure period without holding still, and FIG. 5B shows horizontal/vertical (x/y) coordinates of the symbol of FIG. 3B during the exposure period with holding still. The image capturing device 1 operated according to FIG. 5B will obtain a more clearly exposed background than FIG. 5A.

Referring to FIG. 2, in step 105, the brightness values of the second image may be optionally adjusted. In the embodiment, the adjusting ratios for the brightness values are built in the computing center 14 of the image capturing device 1. The adjusting ratios may be fine adjusted by the user after the second image is captured. The brightness values of the second image may be adjusted according to a length of the exposure period to prevent the second image from being over-exposed. Generally speaking, the longer is the exposure period, the brightness values are decreased with greater amount.

Figure 6:
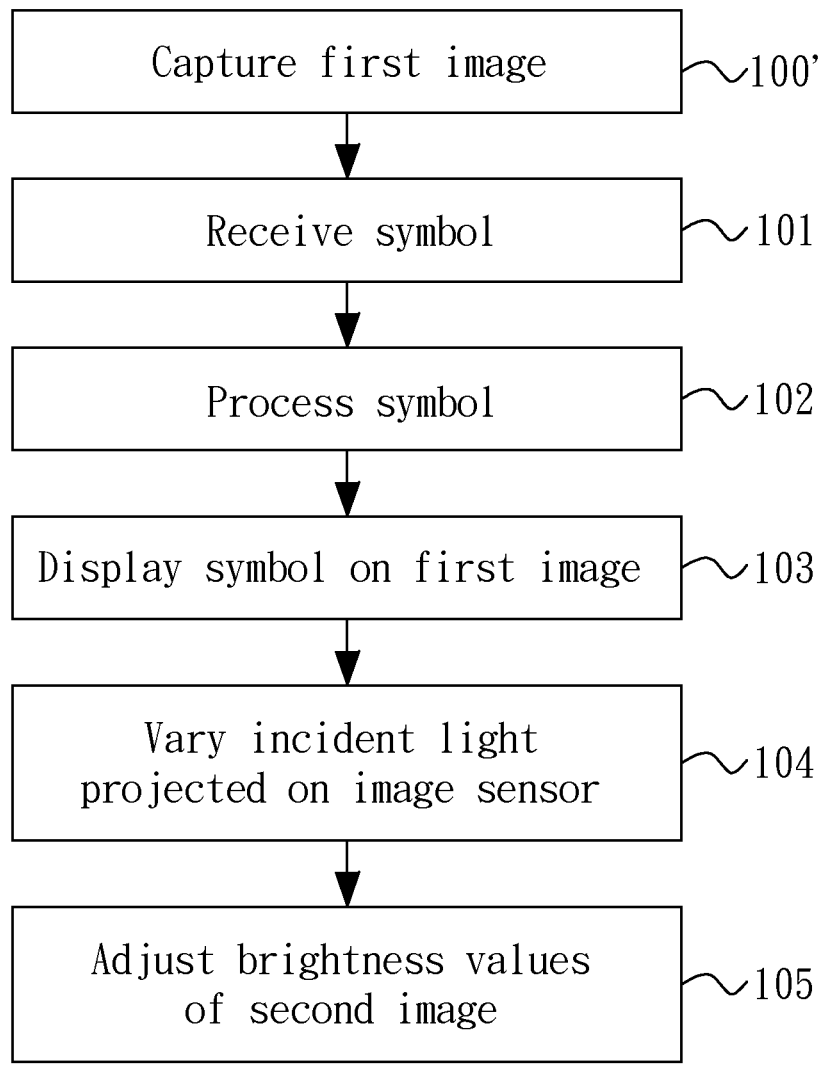
FIG. 6 shows a flow diagram illustrating a method of producing an image according to a second embodiment of the present invention.

FIG. 6 shows a flow diagram illustrating a method of producing an image according to a second embodiment of the present invention. The image capturing device 1 as shown in FIG. 1 may be still adaptable to the flow diagram of FIG. 6. The flow shown in FIG. 6 is similar to the flow shown in FIG. 2, with the distinction that the first image is captured in a step 100' before the symbol is received in step 101. However, in the first embodiment as shown in FIG. 2, the first image is captured in step 100 after the symbol is received in step 101. The steps 101-105 of the present embodiment are the same as the first embodiment, and are thus omitted for brevity.

Figure 7A:
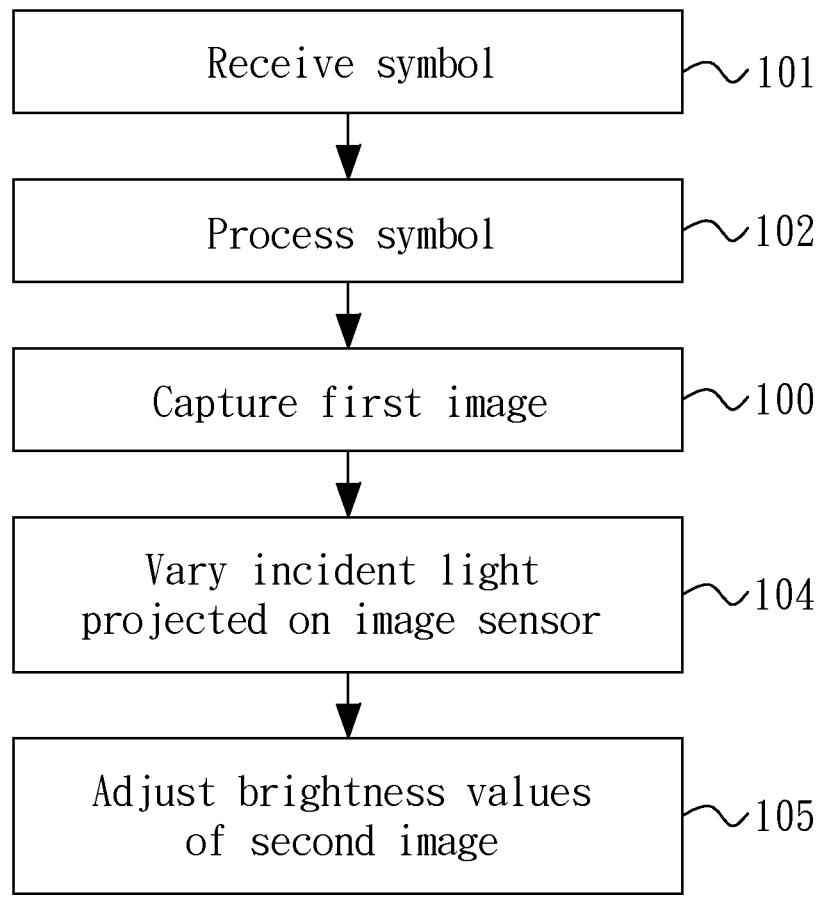
FIG. 7A shows a flow diagram illustrating a method of producing an image according to a third embodiment of the present invention.
Figure 7B:
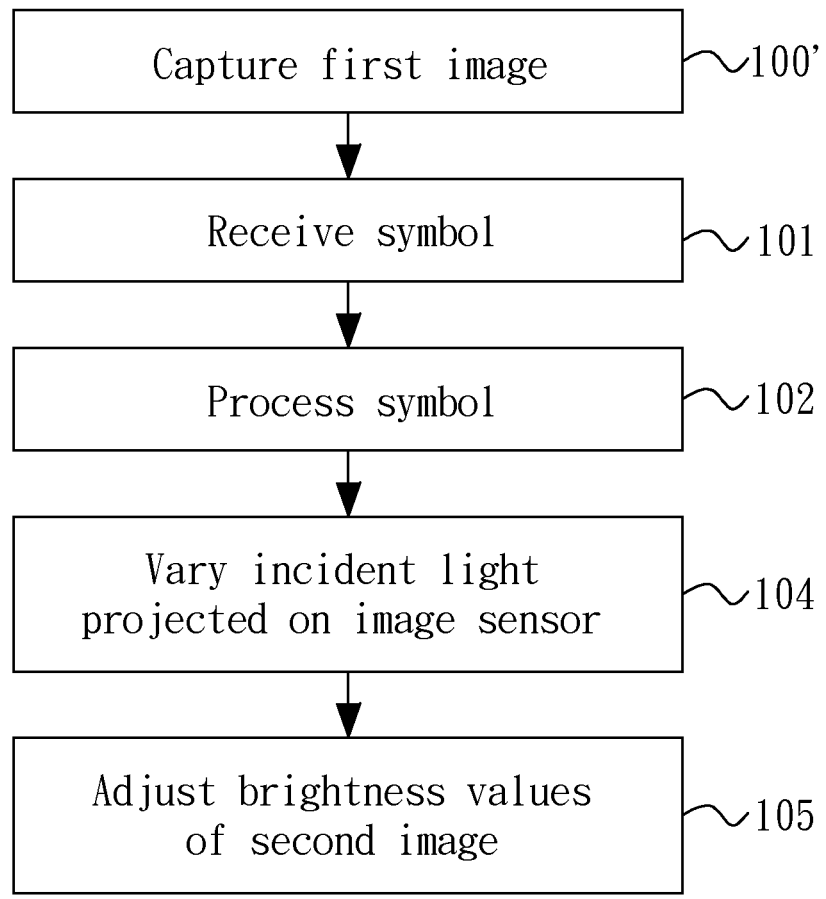
FIG. 7B shows a flow diagram according to an alternative third embodiment of the present invention.

FIG. 7A shows a flow diagram illustrating a method of producing an image according to a third embodiment of the present invention. The image capturing device 1 shown in FIG. 1 may be still adapted to the flow diagram of FIG. 7A. The flow shown in FIG. 7A is similar to the flow shown in FIG. 2, with the distinction that the step 103 is not necessary in the present embodiment. The steps 101-102 and 105 of the present embodiment are the same as the first embodiment, and are thus omitted for brevity. FIG. 7B shows a flow diagram according to an alternative third embodiment of the present invention. The flow shown in FIG. 7B is similar to the flow shown in FIG. 6, with the distinction that the step 103 is not necessary in the present embodiment.

Figure 8A:
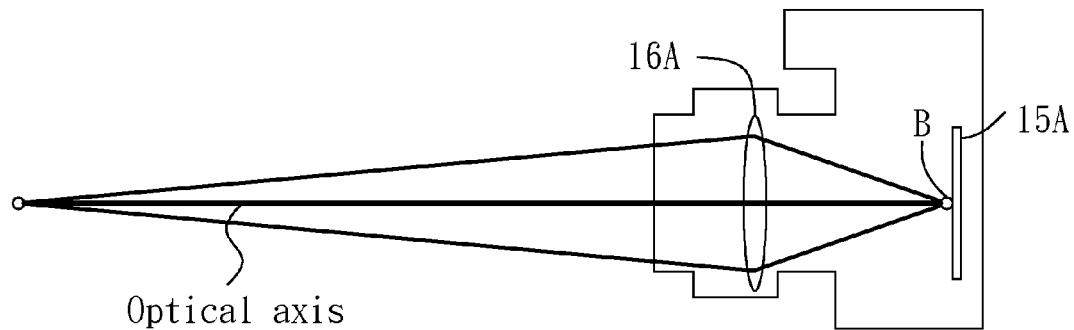
FIG. 8A shows a schematic diagram illustrating a lens and an image sensor.
Figure 8B:
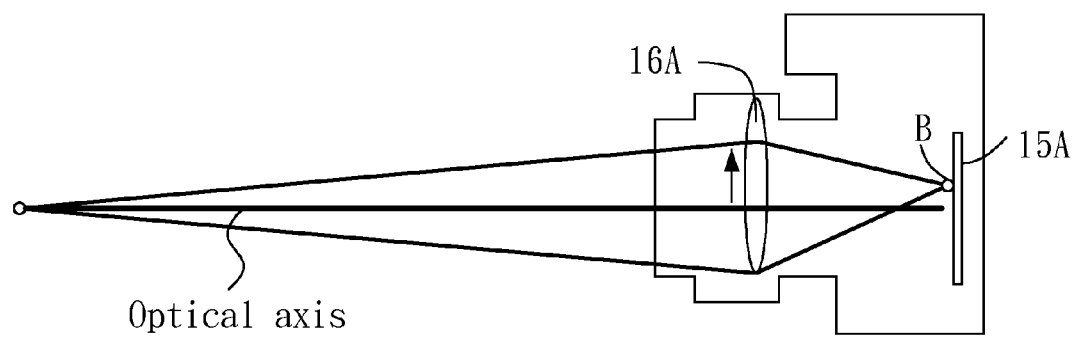
FIG. 8B shows a schematic diagram in that the lens is driven upward relative to the image sensor.

Referring to FIG. 7A/B and FIG. 1, in step 104, the position of the incident light projected on the image sensor 15A may be varied by the sensor driver 15B to drive the image sensor 15A and the lens driver 16B to drive the lens 16A that is under control of the controller 17 for the image sensor 15A and the lens 16A are relative motion. FIG. 8A shows a schematic diagram illustrating the lens 16A and the image sensor 15A. FIG. 8B shows a schematic diagram in that the lens 16A is driven upward relative to the image sensor 15A, such that the position of the incident light projected on the image sensor 15A is also driven upward. According to this embodiment, a light track that traces the symbol is produced on the second image, which is captured by the image sensor 15A.

Figure 8C:
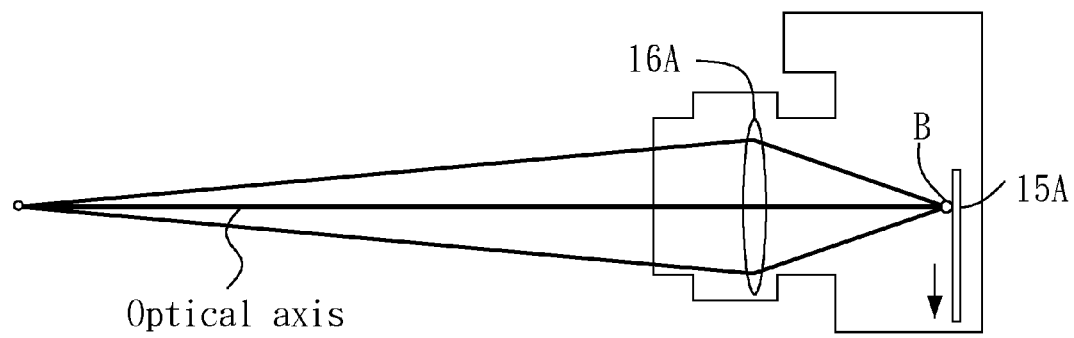
FIG. 8C shows a schematic diagram in that the image sensor is driven downward relative to the lens.

Referring to FIG. 7A/B and FIG. 1, in step 104 of an embodiment alternative to the third embodiment, the position of the incident light projected on the image sensor 15A is varied by moving the image sensor 15A relative to the lens 16A by the sensor driver 15B that is under control of the controller 17. For example, FIG. 8C shows a schematic diagram in that the image sensor 15A is driven downward relative to the lens 16A, such that the position of an incident light projected on the image sensor 15A is driven upward.

Referring to FIG. 7A/B and FIG. 1, in step 104 of a further embodiment alternative to the third embodiment, during the exposure period, the shutter 18 is shut down during a transition period between the adjacent symbols such as that between the first symbol 12A and the second symbol 12B exemplified in FIG. 3A. As a result, no unwanted light track is produced between the first symbol 12A and the second symbol 12B.

Although specific embodiments have been illustrated and described, it will be appreciated by those skilled in the art that various modifications may be made without departing from the scope of the present invention, which is intended to be limited solely by the appended claims.

What is claimed is:

1. A method of producing an image, comprising:
   receiving at least one symbol;
   capturing a first image with at least one light spot;
   displaying the at least one symbol on a first image with at least one light spot; and
   varying a position of an incident light projected on an image sensor of an image capturing device during an exposure period according to the at least one symbol to capture a second image, including blocking the image sensor from exposure during a transition period between two of the symbols in a case where more than one symbol is received.

2. The method of claim 1, after receiving the at least one symbol, further comprising:
   subjecting the at least one symbol to signal processing, low pass filtering, or band pass filtering.

3. The method of claim 1, wherein the first image has at least one light spot, which includes at least one pixel with a brightness value greater than brightness values of pixels of non-light spot portion of the first image.

4. The method of claim 1, wherein the step of varying the position of the incident light comprises:
   moving the image capturing device according to the at least one symbol during the exposure period.

5. The method of claim 1, wherein the step of varying the position of the incident light is followed by a further step of:
   holding the position of the incident light still during a portion of the exposure period.

6. The method of claim 1, further comprising:
   adjusting brightness values of pixels of the second image according to a length of the exposure period.

7. A method of producing an image, comprising:
   capturing a first image with at least one light spot;
   receiving at least one symbol;
   displaying the at least one symbol on the first image; and
   varying a position of an incident light projected on an image sensor of an image capturing device during an exposure period according to the at least one symbol to capture a second image, including blocking the image sensor from exposure during a transition period between two of the symbols in a case where more than one symbol is received.

8. The method of claim 7, after receiving the at least one symbol, further comprising:
   subjecting the at least one symbol to signal processing, low pass filtering, or band pass filtering.

9. The method of claim 7, wherein the first image has at least one light spot, which includes at least one pixel with a brightness value greater than brightness values of pixels of non-light spot portion of the first image.

10. The method of claim 7, wherein the step of varying the position of the incident light comprises:
    moving the image capturing device according to the at least one symbol during the exposure period.

11. The method of claim 7, wherein the step of varying the position of the incident light is followed by a further step of:
    holding the position of the incident light still during a portion of the exposure period.

12. The method of claim 7, further comprising:
    adjusting brightness values of pixels of the second image according to a length of the exposure period.

13. A method of producing an image, comprising:
    receiving at least one symbol;
    varying a position of an incident light projected on an image sensor of an image capturing device during an exposure period according to the at least one symbol to capture an image with a light track that traces the at least one symbol; and
    shutting down a shutter during a transition period between two of the symbols in a case where more than one symbol is received during the exposure period.

14. The method of claim 13, after receiving the at least one symbol, further comprising:
    subjecting the at least one symbol to signal processing, low pass filtering, or band pass filtering.

15. The method of claim 13, wherein the step of varying the position of the incident light comprises:
    moving a lens or the image sensor of the image capturing device relatively for the incident light projected on the image sensor according to the at least one symbol during an exposure period.

16. The method of claim 13, wherein the step of varying the position of the incident light is followed by a further step of:
    holding the position of the incident light still during a portion of the exposure period.

17. The method of claim 13, further comprising:
    adjusting brightness values of pixels of the image according to a length of the exposure period.

* * * * *